United States Patent
Peng et al.

(10) Patent No.: US 9,746,623 B2
(45) Date of Patent: Aug. 29, 2017

(54) MODE CONVERTING WAVEGUIDE FOR HEAT ASSISTED MAGNETIC RECORDING

(75) Inventors: Chubing Peng, Minnetonka, MN (US); Michael A. Seigler, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 267 days.

(21) Appl. No.: 13/283,987

(22) Filed: Oct. 28, 2011

(65) Prior Publication Data

US 2013/0108212 A1    May 2, 2013

(51) Int. Cl.
| | | |
|---|---|---|
| *G02B 6/42* | (2006.01) |
| *G11B 5/31* | (2006.01) |
| *G11B 5/60* | (2006.01) |
| *G02B 6/27* | (2006.01) |
| *G11B 5/00* | (2006.01) |

(52) U.S. Cl.
CPC ............ *G02B 6/4215* (2013.01); *G11B 5/314* (2013.01); *G11B 5/6088* (2013.01); *G02B 6/2766* (2013.01); *G02B 6/4212* (2013.01); *G11B 2005/0021* (2013.01)

(58) Field of Classification Search
CPC ........ G02B 6/34; G02B 6/3214; G02B 6/262; G02B 6/26; G02B 6/30; G02B 2006/12107; G02B 27/0172
See application file for complete search history.

(56) References Cited

U.S. PATENT DOCUMENTS

| | | | |
|---|---|---|---|
| 5,243,669 A * | 9/1993 | Alferness et al. | 385/11 |
| 7,792,402 B2 | 9/2010 | Peng | |
| 8,787,129 B1 * | 7/2014 | Jin et al. | 369/13.33 |
| 2004/0001394 A1 | 1/2004 | Challener et al. | |
| 2004/0001420 A1 | 1/2004 | Challener | |
| 2004/0062503 A1 | 4/2004 | Challener | |
| 2005/0122850 A1 | 6/2005 | Challener et al. | |
| 2005/0135008 A1 | 6/2005 | Challener et al. | |
| 2006/0005216 A1 | 1/2006 | Rausch | |
| 2006/0232869 A1 | 10/2006 | Itagi et al. | |
| 2007/0165495 A1 | 7/2007 | Lee et al. | |
| 2008/0212230 A1 | 9/2008 | Suh et al. | |
| 2009/0074358 A1 | 3/2009 | Itagi et al. | |
| 2009/0290837 A1 * | 11/2009 | Chen et al. | 385/37 |
| 2010/0074063 A1 * | 3/2010 | Peng | G11B 5/02 369/13.32 |
| 2010/0123965 A1 * | 5/2010 | Lee et al. | 360/59 |
| 2010/0208378 A1 * | 8/2010 | Seigler et al. | 360/59 |
| 2010/0214685 A1 | 8/2010 | Seigler et al. | |
| 2010/0271910 A1 * | 10/2010 | Boutaghou | 369/13.33 |
| 2010/0321815 A1 * | 12/2010 | Zhou et al. | 360/59 |
| 2010/0328807 A1 * | 12/2010 | Snyder et al. | 360/59 |

\* cited by examiner

*Primary Examiner* — Thomas A Hollweg
*Assistant Examiner* — Mary A El Shammaa
(74) *Attorney, Agent, or Firm* — Hollingsworth Davis, LLC

(57) ABSTRACT

Light is excited by a light source in a first waveguide mode. The light is converted to a second waveguide mode via a channel waveguide having a cross-sectional geometry normal to a direction of propagation of the light that rotates a polarity of the first waveguide mode to a second waveguide mode. The light in the second waveguide mode is delivered to a near-field transducer that provides electromagnetic heating for a heat assisted magnetic recording write head.

20 Claims, 9 Drawing Sheets

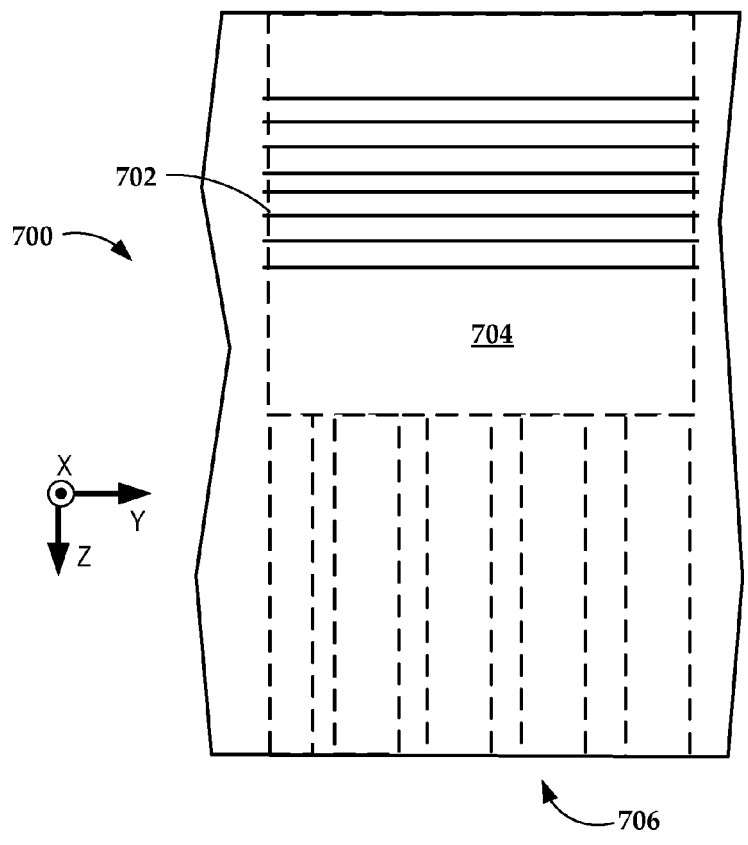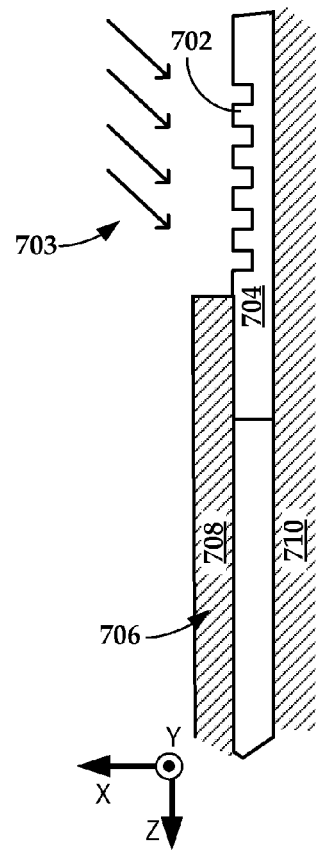
FIG. 7A
FIG. 7B
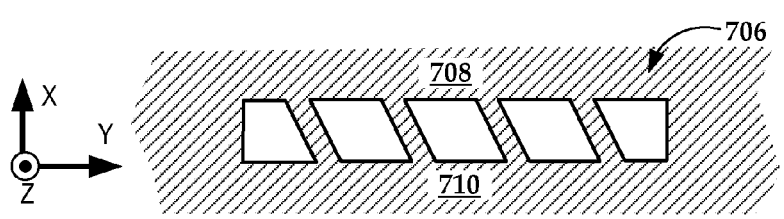
FIG. 7C

MODE CONVERTING WAVEGUIDE FOR HEAT ASSISTED MAGNETIC RECORDING

BACKGROUND

The present disclosure relates to optical components used in applications such as heat assisted magnetic recording (HAMR). A HAMR device utilizes a magnetic recording media (e.g., hard drive disk) that is able to overcome superparamagnetic effects that limit the areal data density of typical magnetic media. In order to record on this media, a small portion of the media is locally heated while being written to by a magnetic write head. A coherent light source such as a laser may provide the energy to create these hot spots, and optical components, e.g., built in to a slider that houses the write head, are configured direct this energy onto the media.

SUMMARY

Various embodiments described herein are generally directed to providing light in a selected waveguide mode for, e.g., exciting a near field transducer of a heat assisted magnetic recording head. In one embodiment, light excited by a light source is received in a first waveguide mode. The light is converted to a second waveguide mode via a channel waveguide having a cross-sectional geometry normal to a direction of propagation of the light that rotates a polarity of the first waveguide mode to a second waveguide mode. The light is delivered in the second waveguide mode to a near-field transducer that provides electromagnetic heating for a heat assisted magnetic recording write head.

In another embodiment, a system includes a light source exciting light in a first waveguide mode and a channel waveguide portion coupled to the light source. The channel waveguide portion has a cross-sectional geometry normal to a direction of propagation of the light that rotates the first waveguide mode to a second waveguide mode. The first waveguide mode is one of a transverse magnetic mode and a traverse electric mode, and the second waveguide mode is the other of the transverse magnetic mode and the traverse electric mode. The system further includes a near-field transducer that receives the light in the second waveguide mode and, in response thereto, delivers electromagnetic heating for a heat assisted magnetic recording write head.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIGS. 7A-7C are diagrams illustrating respective top, side, and end views of a light coupling and mode converting assembly according to an example embodiment;

DETAILED DESCRIPTION

Figure 1:
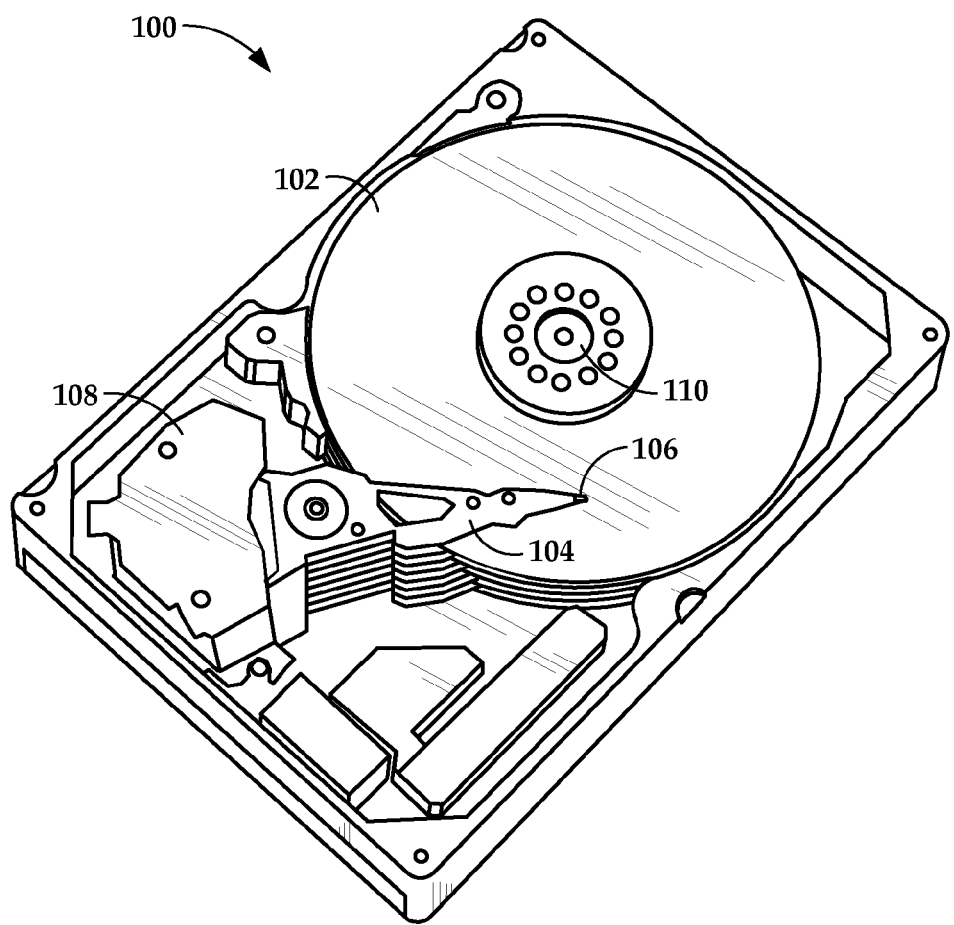
FIG. 1 is a perspective view of a hard drive apparatus according to an example embodiment.

When applying heating energy to a HAMR medium, it is desirable to confine the light to a small hotspot over the track where writing is taking place. In order to create this small hot spot, energy from a light source (such as a laser that is integral to or separate from the write head) may be launched into a waveguide and then focused on to an optical near-field transducer (NFT) by a focusing element. Example NFT transducers may include a plasmonic optical antenna or a metallic aperture. Example focusing elements may include solid immersion lenses (SIL) and solid immersion mirrors (SIM).

The NFT is usually located proximate to the write head to facilitate heating the hot spot during write operations. The waveguide and NFT may be formed as an integral part of a slider that houses the write head. Other optical elements, such as couplers, mirrors, prisms, etc., may also be formed integral to the slider. The optical elements used in HAMR recording heads are generally known as integrated optics devices.

The field of integrated optics relates to the construction of optics devices on substrates, sometimes in combination with electronic components, to produce functional systems or subsystems. For example, an integrated optics device may transfer light between components via rectangular dielectric slab waveguides that are built up on a substrate using layer deposition techniques. These waveguides may be formed as a layer of materials, with a middle layer having a refractive index $n_1$ as a core, and top/bottom layers of refractive indices $n_2$ and $n_3$ performing as cladding. In configurations such as where $n_2=n_3$, $n_1>n_2$, and $n_1>n_3$, light may propagate through the waveguide similarly to an optic fiber.

As is known in the art, electromagnetic waves confined to a waveguide may propagate in one of two possible waveguide modes: transverse electric (TE) and transverse magnetic (TM). In TE mode, the main component of electrical field vector is along x-direction and lies in a plane (denoted herein as the x-y plane) that is transverse to the direction of travel/propagation (the z-direction). In TM mode, the magnetic field vector lies in the x-y plane and is transverse to the direction of propagation.

To achieve good alignment between an optical spot and magnetic pole, some NFT devices will use an incident beam polarized normal to a magnetic pole. In these devices, the dominant near-field component points from the NFT toward the magnetic pole, and opposite charges will be accumulated at the NFT and the magnetic pole. In such circumstances, the incident light polarization needed to excite the NFT will be a TM mode. Accordingly, a waveguide should be coupled to deliver light to the NFT polarized in a TM mode.

Depending on the technology used, the light emitted from a light source may be polarized in either a TM or TE mode. Maximum flexibility is afforded the system designer if available light sources can be used, regardless of the mode in which the light is launched from the light source. Accordingly, in an apparatus described herein, at least a portion of an integrated optics waveguide may be designed so as to change the transverse mode of the light before it is provided to the NFT. Due to the nature of edge-emitting lasers that are described below, the waveguide mode launched by these lasers may be TE polarized. As a result, examples herein may be described as TE-to-TM mode converters. However, it will be appreciated that such devices may also be used to convert from TM to TE modes.

The structures and techniques described herein may be used, for example, in read/write heads of a magnetic data storage device such as hard drive apparatus 100 shown in FIG. 1. The apparatus 100 generally includes at least one magnetic disk 102 that rotates around a spindle axis 110. The apparatus 100 further includes an arm 104 with an end-mounted a transducer head 106 that is positioned over a surface of the disk while reading from or writing to the disk 102. The arm 104 is driven by an actuator 108 to move radially across the disk 102. This movement of the arm 104 positions the transducer head 106 over on the disk 102 to read from or write to tracks on the disk 102. A hard drive of this type may include multiple arms 104 and disks 106 arranged in a stack formation, and may include read/write heads that read/write from/to both surfaces of the disks 102.

The transducer head 106 (also referred to as a "slider") may include both magnetic read and write heads. A read head generally operates by detecting a changing magnetic field, e.g., changes in direction of magnetic flux caused by relative motion between an encoded magnetic media and the read head. The read head converts the flux reversals into an electrical analog signal that represents data stored on the media. The write head operates in response to a current sent through a conductor surrounding a write pole, which generates a magnetic field at a tip of the write pole. This magnetic field in turns changes the orientation of a local magnetic field local at the surface of the disk 102, causing data to be persistently stored on the disk 102.

Figure 2:
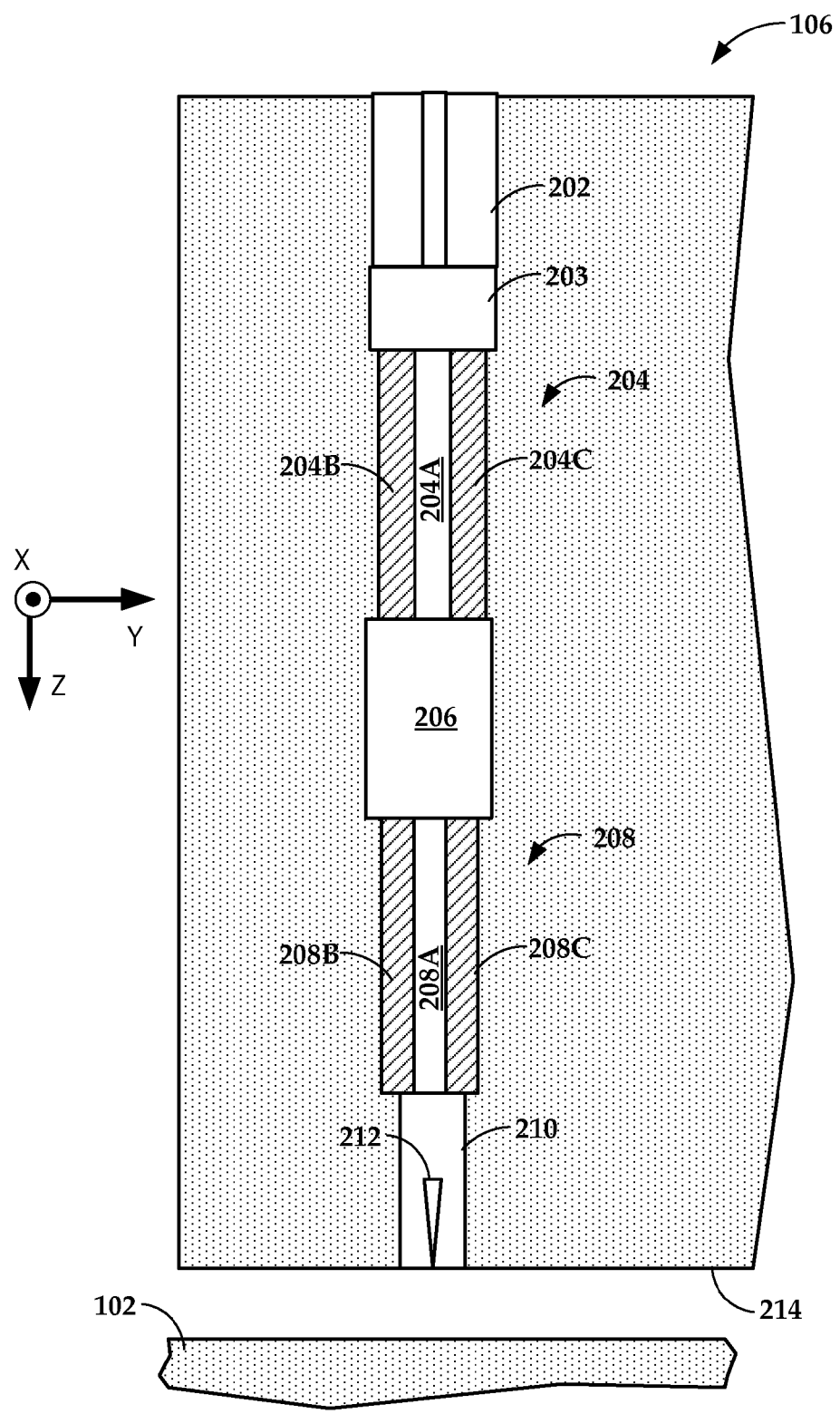
FIG. 2 is a cross-sectional view of a light source, waveguides, mode-converter, and near-field transducer according to an example embodiment of a disk drive slider.

As described above, a HAMR recording device focuses heat on the disk 102 during the write process. The slider 106 may have integrated light delivery, e.g., having a laser diode disposed inside or on the slider 106. A simplified diagram of a slider 106 according to an embodiment is shown in FIG. 2. In this example, a laser diode 202 is integrated into the slider 106. Light from the laser diode 202 is launched into a planar or three-dimensional channel waveguide 204 and propagates in the z-direction (the plane of the waveguide 204 is parallel to the y-z plane).

As shown, the laser diode 202 end-fires into the waveguide 204 via a coupling element 203. The coupling element 203 may include features such as a taper in order to more efficiently launch light into the waveguide 204. The coupling element may be also a grating coupler or evanescent waves coupler. The light propagates through the waveguide 204 to a mode converter 206, where it is converted from TE mode to TM mode (or vice versa). After mode conversion, the light propagates through a second waveguide 208 into a focusing element 210 (e.g., SIL, SIM). The focusing element 210 focuses the light onto an NFT 212 located near an air-bearing surface 214 of the slider 106. A three-dimensional channel waveguide can also be used to deliver the light onto an NFT 212 located near an air-bearing surface 214 of the slider 106. The NFT 206 heats a surface of the disk 102 while a nearby write transducer (not shown) produces a magnetic field directed to the heated portion of the media.

The waveguides 204, 208 may include respective core layers 204a, 208a formed from a high index material such as $Ta_2O_5$, SiNx, ZnS, SiC, and SiOxNy. The core layers 204a, 208a are surrounded by respective cladding layers 204b, 204c, 208b, 208c of a lower index dielectric material such as $Al_2O_3$, $SiO_2$, $MgO_2$, $Y_2O_3$, and AlN. It will be appreciated that these materials are merely exemplary, and other materials with analogous refractive index properties may be used to form core and cladding features of the waveguides 204, 208. As will be described in greater detail below, the mode converter 206 may also include waveguide features formed from similar materials.

It will be appreciated that the configuration in FIG. 2 is an example, and many variations are possible in view of the present teachings. For example one or more of the planar waveguides 204, 208 may be omitted. Similarly, other components may be placed in between the path of the light source 202 and NFT 212, such as channel waveguides, mirrors, prisms, etc. Such components may facilitate, for example, traversing a convoluted path due to the geometry of a particular slider design. Similarly, some or all of the slider 106 may be formed by depositing layers on a substrate. In such a case, the waveguides 204, 206 and mode converter 206 may all be considered part of the same contiguous structure.

The mode converter 206 may be considered an analog of a half-wave plate in bulk optics. A half-wave plate may be formed from a birefringent crystal with a carefully chosen axis along which light is directed. Light polarized along this axis travels through the wave plate at a different speed than light with a perpendicular polarization. This creates a phase difference as the light exits the plate. A half-wave plate has dimensions chosen so as to delay one polarization by half of a wavelength, and thereby shifts/converts polarization of light propagating through the plate along the chosen axis.

Figure 3A:
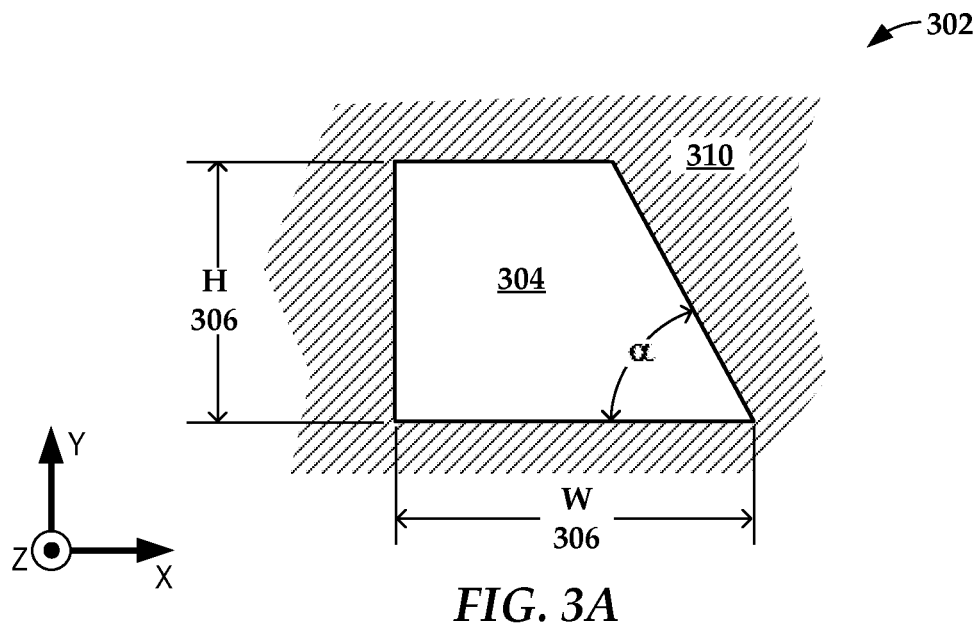
FIGS. 3A-3B are cross-sectional views of mode converter channel waveguides according to example embodiments.
Figure 3B:
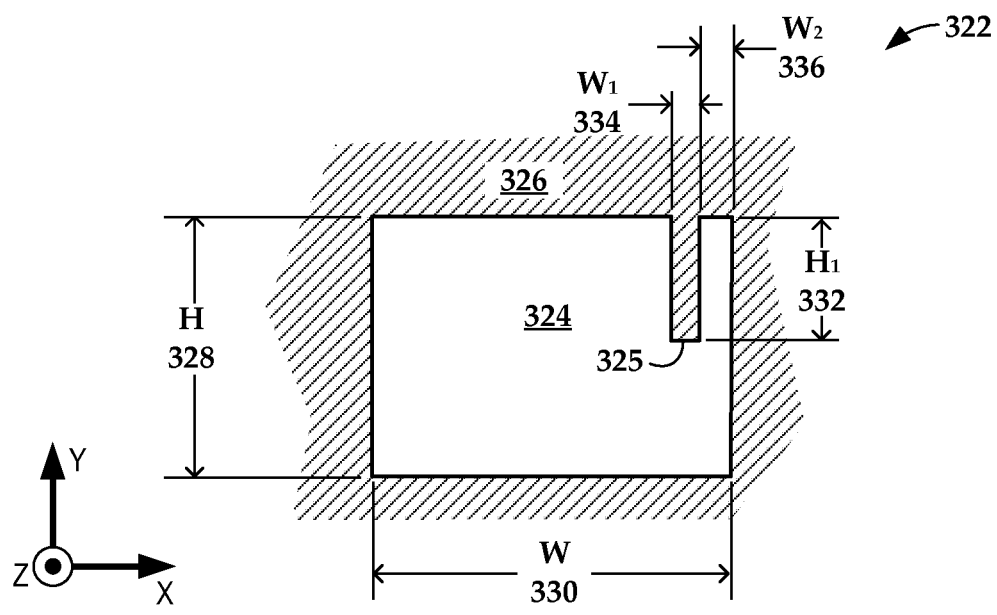

In one embodiment, the mode converter 206 uses an asymmetric channel waveguide to rotate the polarization during propagation from a TE mode to a TM mode, or vice versa. Block diagrams in FIGS. 3A-B illustrate example waveguide cross sections that may achieve this change in polarization. In FIG. 3A, a waveguide 302 includes a core 304 with a trapezoidal cross-sectional shape of height H (306) and width W (308). The trapezoid includes at least one non-right angle α. The core 304 is surrounded by cladding material 310, which is generally a material having a lower refractive index than the core 304.

In FIG. 3B, a waveguide 322 includes a core 324 generally shaped as a rectangle with an off-center protrusion 325 of cladding 326 into the core 324. As with the other waveguide designs, the material forming the cladding 326 has a lower refractive index than the material forming the core 324. The core 324 has height H (328) and width W (330). The protrusion 325 has height $H_1$ (332) and width $W_1$ (334) and is offset from one edge of the core 324 by distance $W_2$ (336).

Asymmetric waveguides such as shown in FIGS. 3A-B have two eigenmodes with their optical axes at 45 degrees rotated from a TE or TM mode. The propagation constant for the two eigenmodes is β1 and β2, respectively. An input TE or TM mode is decomposed into these eigenmodes, which propagate with different phase velocity. After a half beat length, $L=\pi/|\beta_1-\beta_2|$, there is a π phase shift between the two modes, resulting in the desired mode conversion.

Figure 4A:
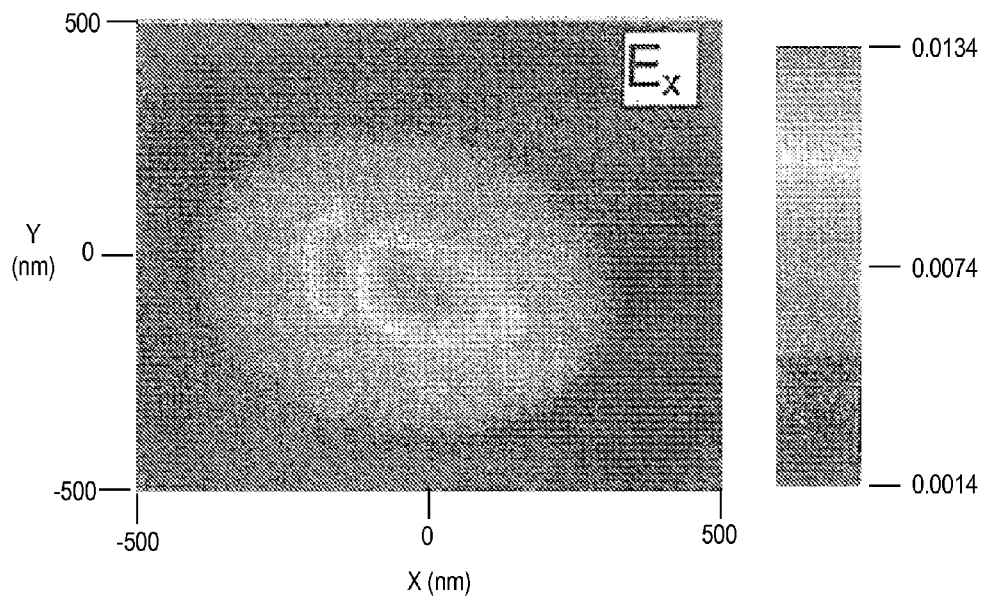
FIG. 4A-4B are computed electrical field graphs of respective x- and y-axis components of an eigenmode of the cross sectional shape of FIG. 3A.
Figure 4B:
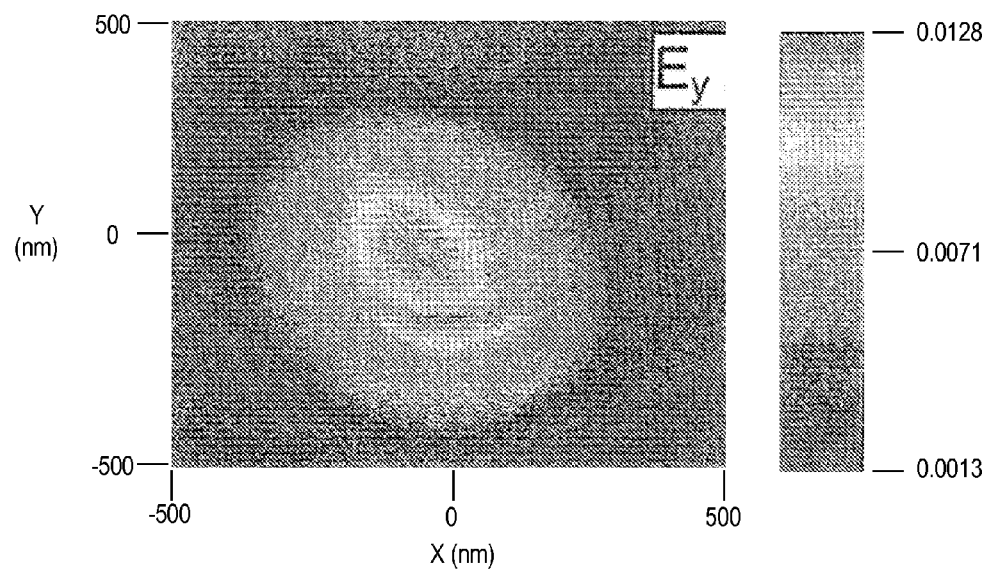

In FIGS. 4A and 4B, a pair of graphs show the computed x- and y-components ($E_x$, $E_y$) respectively of one of the two eigenmodes of the trapezoidal cross sectional shape of FIG. 3A. The geometrical parameters used in the modeling were H (306)=300 nm, W (308)=300 nm, α=45°. For light having wavelength λ=830 nm, the effective mode indices ($\beta_1$*($\beta_2$/

$k_0$, where $k_0$ is the wave number in free space) of the two eigenmodes are 1.671224 and 1.663494, respectively. For full polarization conversion, the converter 206 would be 53.69 µm an long (as measured along the z-axis).

Figure 5A:
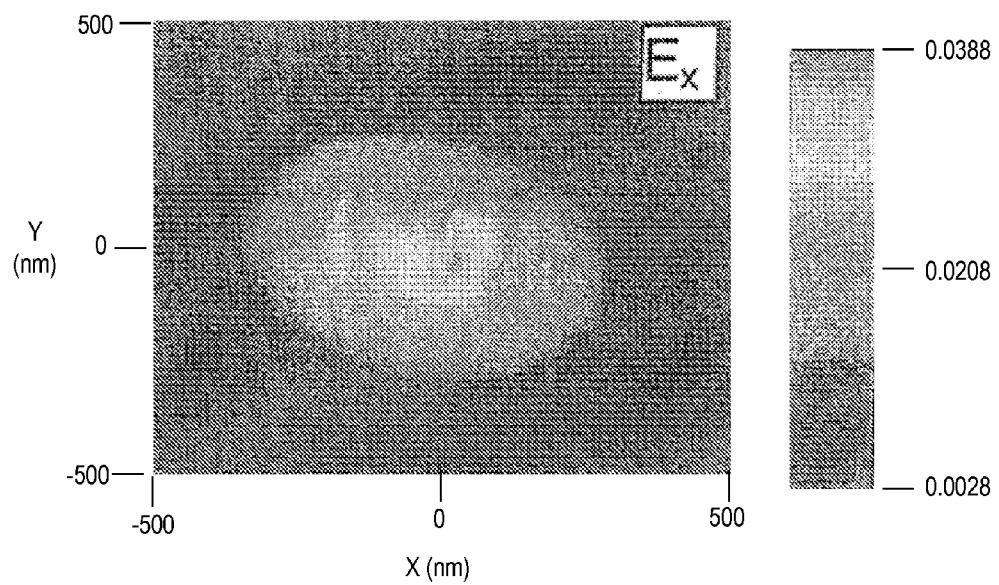
FIG. 5A-5B are computed electrical field graphs of respective x- and y-axis components of an eigenmode of the cross sectional shape of FIG. 3B.
Figure 5B:
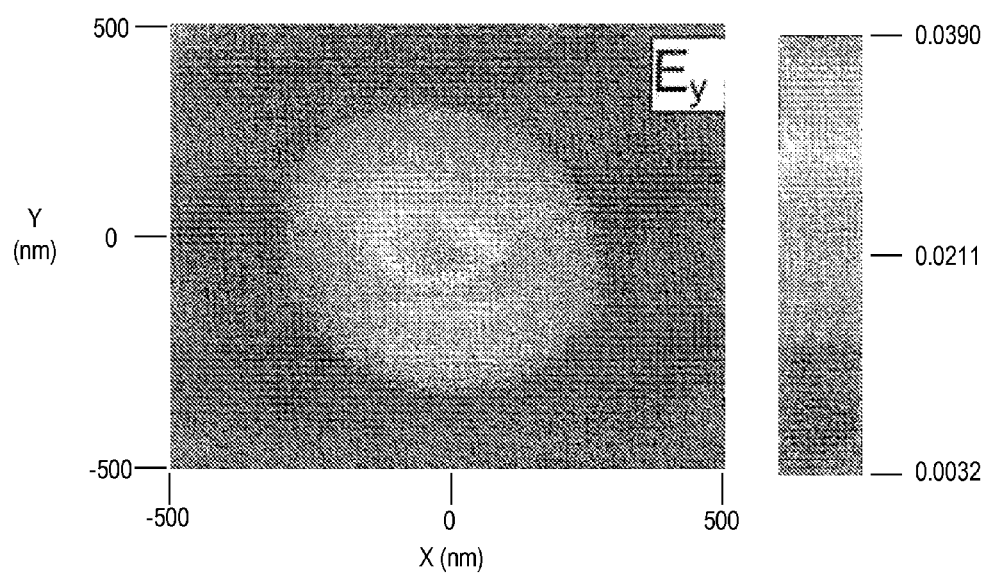

In FIGS. 5A and 5B, a pair of graphs show the computed x- and y-components ($E_x$, $E_y$) respectively of one of the two eigenmodes of the offset trench cross sectional shape of FIG. 3B. The geometrical parameters used in the modeling were H (328)=240 nm, W (330)=300 nm, $H_1$ (332)=160 nm, $W_1$ (334)=80 nm, and $W_2$ (336)=40 nm. For light having wavelength λ=830 nm, the effective mode indices of the two eigenmodes are 1.684019 and 1.680967, respectively. For full polarization conversion, the converter 206 would be 135.98 µm long (as measured along the z-axis).

It should be noted that the mode profile $E_x$ in FIG. 4A is similarly shaped to the mode profile $E_y$ in FIG. 4B. This symmetry is not evident in profiles of FIGS. 5A and 5B, which are based on the offset trench channel shape shown in FIG. 3B. A mode converter 206 having a cross sectional shape such as in FIG. 3B (as well as other channel shapes exhibiting this type of mode profile asymmetry) may use multiple channels in order to improve electrical field symmetry between respective x- and y-components of the electrical fields. For example, a multi-channel mode converter is shown and described below in relation to FIGS. 7A-7C.

Figure 6A:
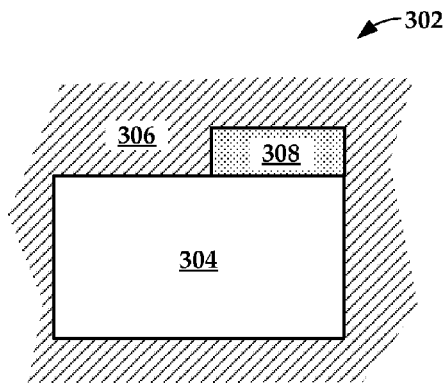
FIGS. 6A-6F are block diagrams illustrate cross-sectional views of channel waveguide portions usable for mode converters according to example embodiments.
Figure 6B:
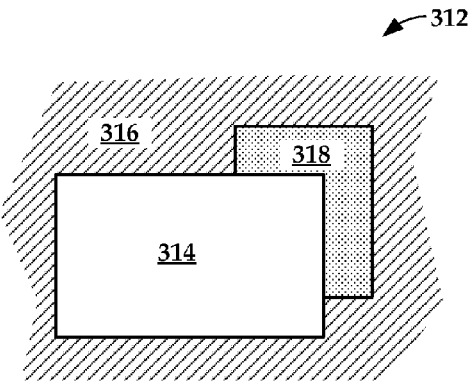

In reference now to FIGS. 6A-6F, block diagrams illustrate channel waveguide cross-sectional shapes usable for mode converters according to other example embodiments. In FIG. 6A, a channel waveguide 302 includes a rectangular core 304 surrounded by first and second cladding materials 306, 308. A similar arrangement is seen in the waveguide 312 in FIG. 6B, which includes core 314 and cladding portions 316 and 318. Generally, the different cladding materials 308, 318 may have a different refractive index than both the cores 304, 314 and other cladding portions 306, 316. The cladding portion 308 in FIG. 6A partly encompasses one side of core 304, while cladding portion 318 in FIG. 6B encompasses at least portions of two sides, and may be extended to additional sides. Other variations may be possible in view of these example mode converter waveguides 302, 312. For example, the cores 304, 314 may include different cross-sectional shapes, and those shapes may be symmetric or asymmetric. In other variations, additional cladding sections with different refractive indices may be used.

Figure 6C:
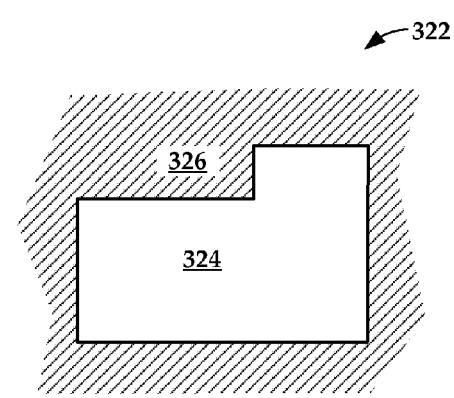
Figure 6D:
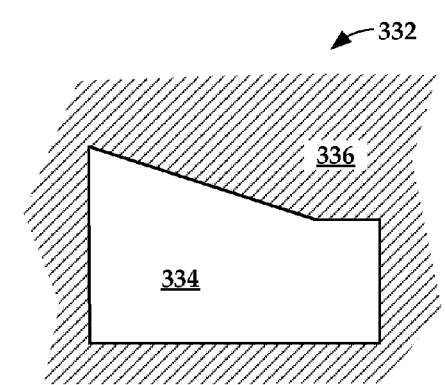
Figure 6E:
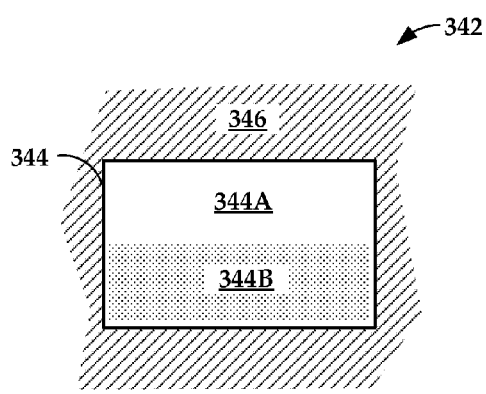
Figure 6F:
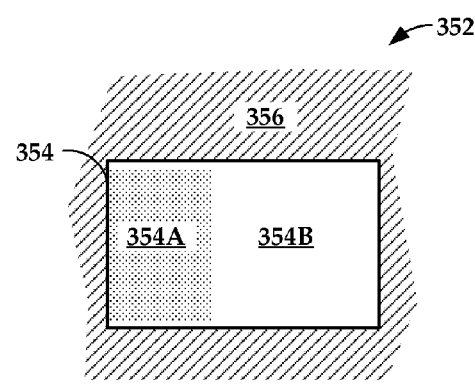

In FIGS. 6C and 6D, channel waveguides 322 and 332 illustrate additional example asymmetric core cross-sectional shapes, as shown respectively by cores 324 and 334. The cores 324, 334 may be covered by at least one type of cladding 326, 336 as previously described. In FIGS. 6E and 6F, channel waveguides 342, 352 include dual layer cores 344, 354, respectively. For example, core 344 includes two layers 344A and 344B, that may include materials with different refractive indices. Both cores 344, 354 may be covered by at least one type of cladding 346, 356 as previously described. The layers 344A-B, 354A-B may be formed, e.g., via layer deposition, by doping the core material at certain layers/portions while forming the waveguides 342, 352.

It will be appreciated that any of the waveguide shapes and features shown in FIGS. 3A-3B and 6A-6F may be used alone or in combination to form a mode converter. As previously shown in FIG. 2, these mode converters may be coupled to additional waveguides and optical elements as is known in the art to deliver electromagnetic energy from a light source to a near-field transducer or the like in order to focus heat on a magnetic medium. While FIG. 2 shows an end-fired technique for launching light into a waveguide, other techniques may be used, such as shown in FIGS. 7A-7C.

In FIGS. 7A-7C, diagrams illustrate respective top, side, and end views of a light coupling and mode converting assembly 700 according to an example embodiment. The assembly includes a grating coupler 702 that receives light 703 launched at an angle into grooves/ridges of the grating 702. Instead of being fired into the end of a waveguide, the light is launched into the side of a planar waveguide portion 704 via the grating coupler 702. A mode converter portion 706 is configured in this example as a 45-degree slanted grating (see FIG. 7C) engraved in the core layer with light propagating along the grooves. Cladding layers 708, 710 may be formed from a single material, or different materials as needed.

Generally, light in a planar waveguide, whether in TE or TM mode, is decomposed into two components with one component parallel to and the other component perpendicular to the grooves. Due to birefringence, the two components will propagate with different phase velocity. The input polarization, which may be either a TM or TE polarization, will rotate to the other of the polarizations if the phase difference reaches π. Accordingly, the grooves of the mode converter portion 706 will be formed with a predetermined characteristic length along the direction of propagation (the z-axis) to provide the desired phase difference. This characteristic length is a function of the wavelength of light used, as well as the cross-sectional geometry of the channel sections 706.

The example cross sectional geometries shown in FIGS. 3A-3B, 6A-6F, and 7A-7C may be substantially constant along the direction of propagation (the z-axis in these examples). However, in some case a mode convertor may also utilize a changing cross sectional geometry along the direction of propagation. This changing of cross sectional geometry is shown by way of example in FIG. 8.

Figure 8:
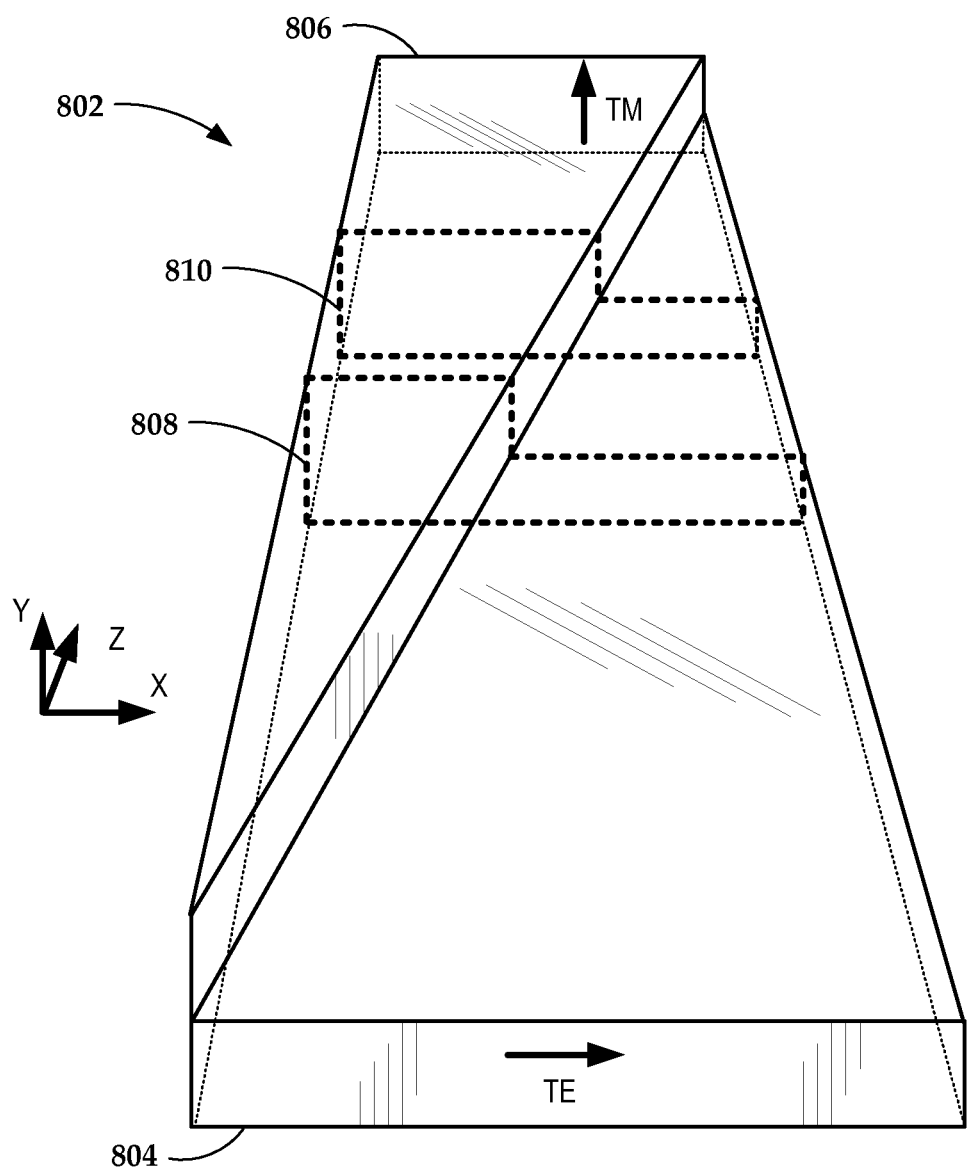
FIG. 8 is perspective view of a channel waveguide with a cross sectional shape varying along the distance of propagation according to an example embodiment.

In FIG. 8, a waveguide 802 is illustrated in perspective view and without any surrounding cladding material. Light is launched into first end 804 in a first mode (here shown as TE mode) and exits at a second end 806 in a second mode (here shown as TM mode). The cross section of waveguide 802 resembles that of FIG. 6C along a large portion of the waveguide's propagation length. However, at least some dimensions of the upper portion of the waveguide 802 vary linearly along the length, and may resemble a rectangle at the very ends 804, 806 of the waveguide 802. Elsewhere, the waveguide 802 exhibits a different cross sectional shape at different locations along the z-axis, as represented by sample cross sectional outlines 808 and 810.

It will be appreciated that the concept of changing/varying the cross sectional shape may be extended to other cross-sectional geometries shown herein, including those with asymmetric overlay of cladding materials. In addition, the cross-sectional geometry parameters may vary along the z-direction according to any combination of functions, including as linear, parabolic, exponential, hyperbolic, logarithmic, step-wise, etc.

Figure 9:
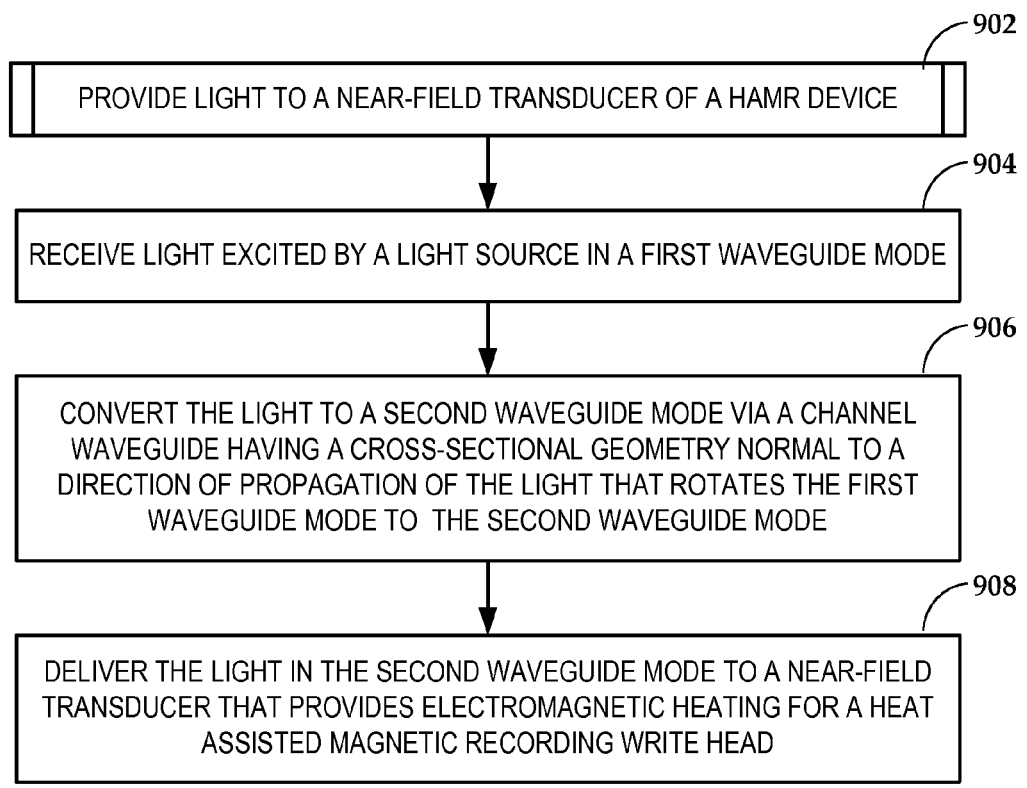
FIG. 9 is flowchart illustrating a procedure according to an example embodiment.

In reference now to FIG. 9, a flowchart illustrates a procedure 902 for providing light to a NFT of a HAMR device (or other device utilizing optical energy for the production of heat). The procedure involves receiving 904 light excited by a light source in a first waveguide mode. The light is converted 906 to a second waveguide mode via a channel waveguide having a cross-sectional geometry normal to a direction of propagation of the light that rotates a polarity of the first waveguide mode to a second waveguide mode. The light is then delivered 908 in the second waveguide mode to a near-field transducer that provides electromagnetic heating for a heat assisted magnetic recording write head.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. For example, some of the optical components in FIG. 2 may be optional (e.g., coupler 203, one or more of waveguide portions 204, 208) and may utilize additional components that are not shown in the figures (e.g., optical splitters, mirrors, etc.). It is intended that the scope of the invention be limited not with this detailed description, but rather determined by the claims appended hereto.

What is claimed is:

1. An apparatus comprising:
    an optical coupler that receives light excited by a light source in a first waveguide mode;
    a near-field transducer that provides electromagnetic heating for a heat assisted magnetic recording write head; and
    a channel waveguide portion coupled between the optical coupler and the near field transducer, wherein the channel waveguide has a cross-sectional geometry normal to a direction of propagation of the light in the waveguide portion that rotates the first waveguide mode to a second waveguide mode for delivery to the near field transducer.

2. The apparatus of claim 1, wherein the cross-sectional geometry comprises an asymmetric cross-sectional core geometry.

3. The apparatus of claim 2, wherein the asymmetric cross-sectional core geometry comprises a trapezoid.

4. The apparatus of claim 2, wherein the asymmetric cross-sectional core geometry comprises a rectangle with an off-center protrusion into the core.

5. The apparatus of claim 2, wherein the channel waveguide comprises a plurality of channels.

6. The apparatus of claim 1, wherein the cross-sectional geometry comprises first and second portions of cladding surrounding respective first and second portions of a core of the channel waveguide, wherein the first portion of cladding has a different refractive index than the second portion of cladding.

7. The apparatus of claim 1, wherein the cross-sectional geometry of the channel waveguide comprises a core comprising first and second portions of differing refractive indices.

8. The apparatus of claim 1, wherein the cross-sectional geometry changes along the direction of propagation.

9. The apparatus of claim 1, wherein the optical coupler facilitates end-firing the light from the light source into a waveguide of the apparatus.

10. The apparatus of claim 1, wherein the optical coupler comprises a grating coupler.

11. A method comprising:
    receiving light excited by a light source in a first waveguide mode;
    converting the light to a second waveguide mode via a channel waveguide having a cross-sectional geometry normal to a direction of propagation of the light in the channel waveguide that rotates the first waveguide mode to the second waveguide mode; and
    delivering the light in the second waveguide mode to a near-field transducer that provides electromagnetic heating for a heat assisted magnetic recording write head.

12. The method of claim 11, wherein receiving the light comprises end-firing the light from the light source.

13. The method of claim 11, wherein receiving the light comprises receiving the light via a grating coupler.

14. A system comprising:
    a light source exciting light in a first waveguide mode;
    a channel waveguide portion coupled to the light source and having a cross-sectional geometry normal to a direction of propagation of the light in the channel waveguide portion that rotates the first waveguide mode to a second waveguide mode, wherein the first waveguide mode comprises one of a transverse magnetic mode and a traverse electric mode, and wherein the second waveguide mode comprises the other of the transverse magnetic mode and the traverse electric mode
    a near-field transducer that receives the light in the second waveguide mode and, in response thereto, delivers electromagnetic heating for a heat assisted magnetic recording write head.

15. The system of claim 14, wherein the cross-sectional geometry comprises an asymmetric cross-sectional core geometry.

16. The system of claim 15, wherein the channel waveguide comprises a plurality of channels.

17. The system of claim 14, wherein the cross-sectional geometry comprises first and second portions of cladding surrounding respective first and second portions of a core of the channel waveguide, wherein the first portion of cladding has a different refractive index than the second portion of cladding.

18. The system of claim 14, wherein the cross-sectional geometry of the channel waveguide comprises a core comprising first and second portions of differing refractive indices.

19. The system of claim 14, wherein the light source end-fires the light into a waveguide coupled to the channel waveguide portion.

20. The system of claim 14, wherein the light source launches the light into a grating coupler optically coupled to the channel waveguide portion.

* * * * *